Aug. 22, 1967   J. CHERUBIM   3,337,276
TILTING PAD JOURNAL BEARING
Filed Feb. 16, 1965   2 Sheets-Sheet 1

INVENTOR.
JUSTIN CHERUBIM
BY Charles Marks
ATTORNEY

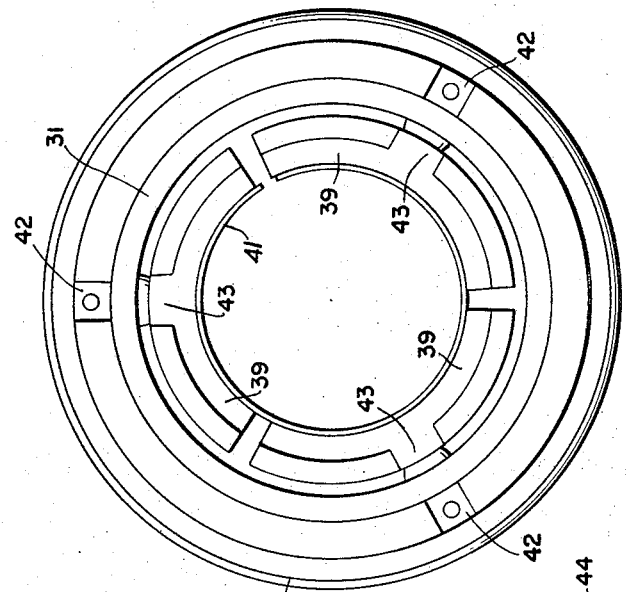
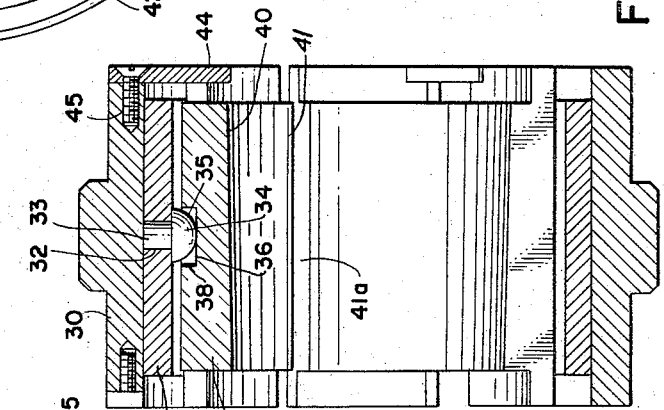
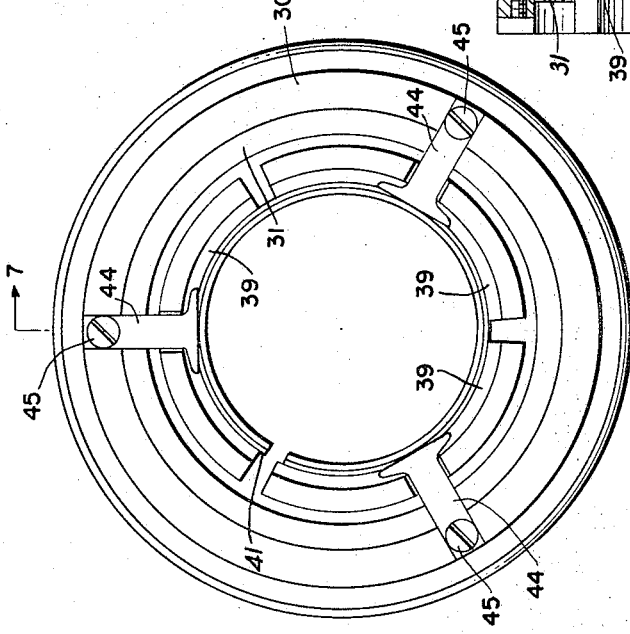
FIG. 8
FIG. 7
FIG. 6
INVENTOR.
JUSTIN CHERUBIM
BY Charles Marks
ATTORNEY

United States Patent Office 3,337,276
Patented Aug. 22, 1967

3,337,276
TILTING PAD JOURNAL BEARING
Justin Cherubim, 24 Jamaica Ave.,
Wyandanch, N.Y. 11798
Filed Feb. 16, 1965, Ser. No. 432,998
5 Claims. (Cl. 308—73)

This invention relates to tilting pad journal bearings.

A principal object of the invention is to provide a tilting pad journal bearing which is adjustable to provide a variety of diametral clearances between its tilting pads and a shaft received therein.

Another object of the invention is to provide a tilting pad journal bearing which is adapted to use a variety of fluid lubricants and which can support a great variety of loads throughout a great range of shaft speeds.

Another object of the invention is to provide a tilting pad journal bearing of the character described which is easy to assemble, maintain and disassemble.

A further object of the invention is to provide a tilting pad journal bearing of the character described which is composed of a small number of parts and which is of simple, economical and sturdy design.

Other objects and advantages of the invention will be apparent from the following detailed description of one embodiment thereof, as read in connection with the accompanying drawing, submitted for purposes of illustration only and not intended to define the scope of the invention, reference being had for that purpose to the subjoined claims.

The drawings illustrate by way of example, not by way of limitation, forms of the invention wherein like reference numerals designate corresponding parts in the several views in which:

FIGURE 6 is an end of a modified form of the invention;

FIGURE 7 is a cross-sectional view taken about the line 7—7 of FIGURE 6; and

FIGURE 8 is a left-end view of the device depicted in FIGURE 7.

The invention disclosed herein is not limited in its application to the method and details of construction and arrangement of parts shown and described, since the invention is capable of other embodiments and of being practiced or carried out in various other ways. It is also to be understood that the phraseology or terminology employed herein is for the purpose of description and not of limitation.

Briefly, this invention comprises a housing having a tapered liner, provided with a series of pins upon which the bearing pads or shoes can tilt or pivot so as to support a rotating shaft associated therewith. The liner is also formed so as to have an adjustable internal diameter, thereby determining the radial position of the pins and bearing shoes thereon.

Figure 2:
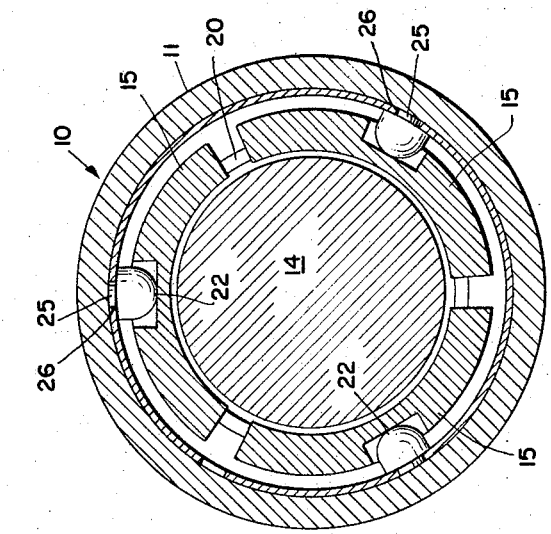
FIGURE 2 is a cross-sectional view taken about the line 2—2 of FIGURE 1.
Figure 1:
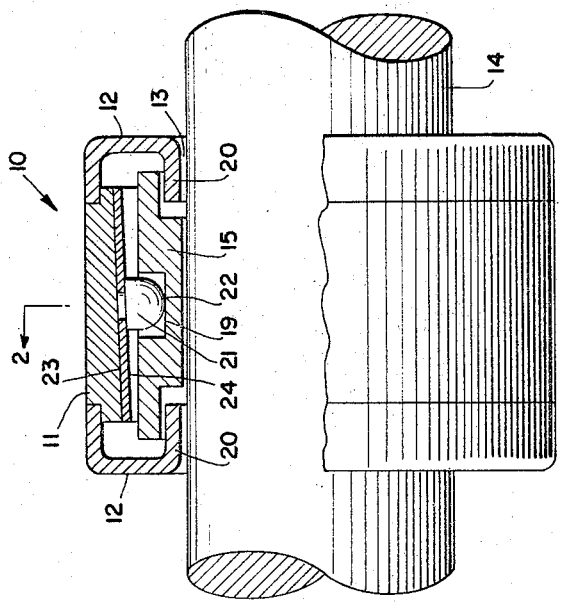
FIGURE 1 is a partial cross-sectional view of one embodiment of the invention.

FIGURES 1 through 5 of the drawings disclose a preferred embodiment of the invention. As seen in FIGURES 1 and 2, this embodiment of the invention comprises a journal bearing, generally designated by the numeral 10 and including a hollow, cylindrical housing 11 frictionally engaged with a pair of oppositely disposed end caps 12.

Each of these end caps 12 is provided with a circular mouth 13 which permits reception of a rotatable shaft 14 within said housing 11. This shaft 14 is depicted in FIGURES 1 and 2 in that position which it will occupy during rotation, i.e., in spaced relation with respect to a plurality of bearing shoes or pads 15 which shall hereinafter be described in greater detail.

Figure 3:
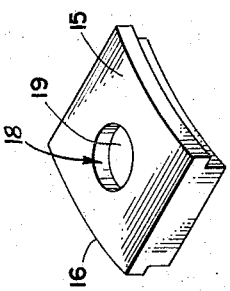
FIGURE 3 is a three dimensional view of a typical tilting pad employed in the aforesaid embodiment of the invention.

Thus, one of such bearing pads 15 is depicted in FIGURE 3. As seen in this figure, the pad 15 is a curved member having a generally rectangular conformation and provided with oppositely disposed flanges 16. The upper surface of the pad 15 is provided with a cavity 18 having a planar base 19.

As shown in FIGURE 2, the curvature of each of the pads 15 conforms generally to that of the circumferential periphery of the shaft 14; and, as may be seen in FIGURE 1, movement of each pad 15 towards the axis of the housing 11 is limited by a pair of annular lips 20 depending from the end caps 12, and defining the aforesaid circular mouth 13, the flanges 16 of the pads 15 being urged to surmount said lips 20 by pins 21 disposed within the cavities 18.

Each of these pins 21 has a generally cylindrical conformation terminating in a hemispherical head 22 which is engageable with the planar base 19 of the cavity 18 in which it is received, thereby permitting the pad 15 having such cavity 18 to tilt or pivot upon the hemispherical head 22. Such tilting or pivoting of the pad 15 can accommodate a hydrodynamic fluid film of lubricant (not shown) which may be interposed in the conventional manner between the pad and the surface of the shaft 14, the fluid film thereby disposing said pad 15 in spaced relation with respect to the surface of the shaft 14 during its rotation.

An important feature of the invention resides in its means for adjusting the clearance between the bearing pads 15 and the shaft 14. To this end, it will be noted from FIGURE 1 that the internal periphery 23 of the housing 11 is tapered and is slidably engaged with a tapered liner 24, which yieldably conforms with said internal periphery 23. The pins 21 depend from the liner 24, each of said pins 21 being provided with a suitable axial extension 25 frictionally accommodated within an aperture 26 formed in the liner 24.

Figure 5:
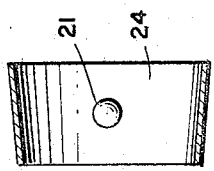
FIGURE 5 is a vertical cross-sectional view of the pin-retaining means depicted in FIGURE 4.
Figure 4:
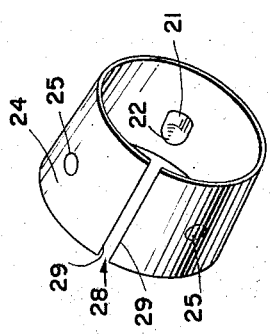
FIGURE 4 is a three dimensional view of the means for retaining the pins upon which the tilting pads pivot in the said form of the invention.

The liner 24 is more clearly shown in FIGURES 4 and 5 of the drawing where it will be noted that the liner is split longitudinally, as at 28, thereby forming two separated end portions 29 thereof. The liner 24 is also composed of a springable material which is normally biased towards maintaining the separation between the end portions 29.

Referring to FIGURE 1 of the drawing, it will be seen that the liner 24 may be displaced axially with respect to the housing 11. This may be accomplished, for example, by removing one of the end caps 12 from its frictional engagement with the housing 11 and exerting a suitable thrust upon the liner 24 so as to slide it to any desired position upon the internal periphery 23 of the housing 11. It will be seen that by this procedure, the end portions 29 of the liner 24 may be urged towards each other or permitted to approach their normal bias, depending upon the position of the liner 24 within the housing 11. By the same token, the diameter of the liner 24 at its mid-point may be adjusted so as to be smaller or larger, thereby accomplishing a corresponding adjustment of the radial position of the pins 21 and of each bearing pad 15.

Hence, this arrangement permits adjustment of the bearing pads so as to accomplish a variation in the diametral clearance between them and the shaft 14. In this way, the bearing permits substantial adjustment of the hydrodynamic film thickness of the lubricant accommodated by such clearance and a corresponding variation in the radial bearing loads which may be supported by the bearing.

FIGURES 6 through 8 depict a modified form of the invention wherein an adjustable liner is disposed upon the internal periphery of a series of pivotable pads disposed within the bearing housing.

Thus, as may be seen in FIGURE 7 of the drawings, this modified form of the invention comprises a housing 30 provided with a sleeve 31 slidably engaged with the internal periphery of the housing 30. The sleeve 31 includes radial apertures, as at 32, for example, each of which receives the axial extension 33 of a pin 34 formed with a hemispherical head 35.

The hemispherical head 35 of said pin 34 is engaged with the planar base 36 of a cavity 38 formed in the radially outermost surface of an annularly disposed tiltable pad 39.

An important feature of this form of the invention resides in the tapered internal periphery 40 of each said pad 39 which is frictionally engaged with a sleeve 41 provided with a longitudinal split 41a. The sleeve 41 is biased in a radially outward direction, thereby urging it into conformity with the aforesaid tapered internal periphery 40 of each said pad 39.

The sleeve 41 may be axially adjusted with respect to the pads 39 and in this way, a corresponding variation of the internal diameter of the sleeve 41 can be effected. Here again, when a rotatable shaft (not shown) is housed within the sleeve 41, the thickness of any film of lubricant interposed between the shaft and sleeve 41, may be determined by such adjustment.

The pads 39 are pivotably disposed upon the heads 35 of the pins 34 and therefore, they can accommodate radial pressures imposed by the shaft and lubricant film upon the sleeve 41. Thus, variations in such radial pressures which occur with a given bearing load and which will not be uniformly imposed upon the annular surface of the sleeve 41, will urge the pads 39 to assume a tilted position and since, as previously noted, the sleeve 41 is biased to conform with the internal periphery 40 of each pad 39, the portions of the sleeve 41 in contact with each pad 39 will tend to assume a similar inclination, thereby permitting the formation of a wedge-shaped film of lubricant which will support the shaft. In effect, the sleeve 41, functions as a yieldable sheath which covers the tiltable pads 39 and is sufficiently flexible to assume their inclination so as to permit wedge-shaped hydrodynamic films in the vicinity of those portions of the sleeve 41 which are supported by the pads 31.

At each opposing end of the housing 30 a plurality of radial grooves 42 are formed and aligned with radial grooves 43 formed at the opposing ends of the pads 39. These grooves 42, 43 are adapted to accommodate T-shaped retainers 44 which, as shown in FIGURE 6, are secured to the housing 30 by fasteners, such as screws 45. The retainers 44 obstruct axial displacement of the pads 39 from the housing 30. As shown in FIGURE 8, wherein an end of the housing is depicted without the retainers 44 being secured thereon, their absence permits access to the interior of the housing 30 for maintenance purposes and for adjustment of the sleeve 41.

Each of the described forms of the invention, by reason of its adaptability to a variety of lubricant film thicknesses, can be employed with those fluid lubricants in which optimum lubricant film thicknesses are available and therefore, can accommodate a corresponding variety of loads imposed at different shaft speeds.

It is also noteworthy that while the described forms of the invention include a split liner or split sleeve, continuous liners or sleeves may also be employed, in which event, their internal diameters will be variable by compression determined by their axial disposition with respect to the tapered surfaces engaged therewith.

The embodiments of the invention illustrated and described hereinabove have been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:
1. In a tilting pad journal bearing supporting a rotatable shaft, the combination comprising:
   (a) a housing provided with an internal periphery having a contracted portion;
   (b) a plurality of bearing pads within the housing;
   (c) a clearance between the bearing pads and the rotatable shaft during rotation thereof, said clearance accommodating a fluid film of lubricant;
   (d) a radially yieldable annular liner surmounting the internal periphery of the housing and contactable with the contracted portion thereof;
   (e) pivot means depending from the liner;
   (f) said bearing pads being supported on said pivot means;
   (g) said clearance being determined upon longitudinal adjustment of the radially yieldable, annular liner with respect to the contracted portion of the internal periphery of the housing.

2. In a tilting pad journal bearing supporting a rotatable shaft, the combination comprising:
   (a) a housing having a tapered internal periphery;
   (b) a plurality of bearing pads within the housing;
   (c) a clearance between the bearing pads and the rotatable shaft during rotation thereof, said clearance accommodating a fluid film of lubricant;
   (d) a resilient liner yieldably conforming with the tapered internal periphery of the housing;
      (i) said liner being axially displaceable with respect to the internal periphery of the housing;
      (ii) said axial displacement determining the radical disposition of said liner;
   (e) pivot means depending from the liner;
   (f) said bearing pads being supported on said pivot means;
   (g) said clearance being determined upon the radial disposition of said liner.

3. In a device according to claim 2:
   (a) said liner being longitudinally split;
   (b) said liner being composed of a springable material.

4. In a device according to claim 2:
   (a) said pivot means including a plurality of radial pins provided with hemispherical end portions;
   (b) a cavity formed in each of said bearing pads;
   (c) each said cavity being provided with a planar base;
   (d) each of said hemispherical end portions being contactable with one of said planar bases.

5. In a tilting pad journal bearing supporting a rotatable shaft, the combination comprising:
   (a) a housing;
   (b) an annular sleeve engaged with the internal periphery of the housing;
   (c) pivot means depending from said annular sleeve;
   (d) a plurality of pads tiltably supported upon said pivot means;
   (e) said pads having a tapered internal periphery;
   (f) a radially yieldable, annular liner surmounting the tapered internal periphery of said pads; said radially yieldable, annular liner accommodating the rotatable shaft and a fluid film of lubricant disposed between said rotatable shaft and radially yieldable, annular liner;
   (g) a clearance between said radially yieldable, annular liner and said rotatable shaft during rotation thereof;

(h) said clearance being determined upon longitudinal adjustment of the radially yieldable, annular liner with respect to the tapered internal periphery of said pads.

References Cited

UNITED STATES PATENTS

| | | | |
|---|---|---|---|
| 1,356,561 | 10/1920 | Sanford | 308—71 |
| 1,421,208 | 6/1922 | Gauldie | 308—73 |
| 1,554,520 | 9/1925 | Prilipp et al. | 308—71 |
| 2,609,252 | 9/1952 | Ranney | 308—71 |

FOREIGN PATENTS 695,116  8/1953  Great Britain.

MARTIN P. SCHWADRON, *Primary Examiner.*

R. F. HESS, *Assistant Examiner.*